United States Patent
Kuosa et al.

(10) Patent No.: US 10,625,178 B2
(45) Date of Patent: Apr. 21, 2020

(54) REMOVAL OF ORGANIC SOLVENTS FROM AQUEOUS PROCESS STREAMS

(71) Applicant: OUTOTEC (FINLAND) OY, Espoo (FI)

(72) Inventors: Markku Kuosa, Lappeenranta (FI); Antti Häkkinen, Lappeenranta (FI); Leena Tanttu, Lappeenranta (FI); Timo Jauhiainen, Lappeenranta (FI); Bjarne Ekberg, Turku (FI)

(73) Assignee: OUTOTEC (FINLAND) OY, Espoo (FI)

(*) Notice: Subject to any disclaimer, the term of this patent is extended or adjusted under 35 U.S.C. 154(b) by 91 days.

(21) Appl. No.: 16/120,727

(22) Filed: Sep. 4, 2018

(65) Prior Publication Data
US 2018/0369718 A1     Dec. 27, 2018

Related U.S. Application Data

(63) Continuation of application No. PCT/FI2016/050147, filed on Mar. 10, 2016.

(51) Int. Cl.
| | | |
|---|---|---|
| *B01D 17/04* | (2006.01) | |
| *B01D 17/00* | (2006.01) | |
| *B01D 39/06* | (2006.01) | |
| *C22B 3/26* | (2006.01) | |
| *B01D 24/10* | (2006.01) | |

(Continued)

(52) U.S. Cl.
CPC ........... *B01D 17/10* (2013.01); *B01D 17/04* (2013.01); *B01D 17/045* (2013.01); *B01D 24/105* (2013.01); *B01D 39/06* (2013.01); *C22B 3/0005* (2013.01); *C22B 3/04* (2013.01); *C25C 1/00* (2013.01); *B01D 2239/1241* (2013.01);

(Continued)

(58) Field of Classification Search
CPC ........ B01D 17/10; B01D 39/06; B01D 17/04; B01D 24/105; B01D 17/045; B01D 2239/1241; C22B 3/005; C22B 3/04; C25C 1/00; C02F 1/40; C02F 2103/16; Y02P 10/234
USPC ......................................... 210/799
See application file for complete search history.

(56) References Cited

U.S. PATENT DOCUMENTS

| | | |
|---|---|---|
| 3,901,818 A | 8/1975 | Durand et al. |
| 4,129,499 A | 12/1978 | Cairns et al. |

(Continued)

FOREIGN PATENT DOCUMENTS

| | | |
|---|---|---|
| DE | 102012013512 A1 | 1/2014 |
| FR | 1477417 A | 4/1967 |
| WO | WO-2006130052 A1 | 12/2006 |

OTHER PUBLICATIONS

Extended European Search Report issued by the European Patent Office in relation to European Patent No. 16893352.1 dated Jul. 3, 2019 (8 pages).

(Continued)

*Primary Examiner* — Thomas M Lithgow
(74) *Attorney, Agent, or Firm* — Robert P. Michal, Esq.; Carter, DeLuca & Farrell LLP

(57) ABSTRACT

A method for separating organic solvent(s) from an aqueous process stream including organic solvent(s), includes passing the aqueous stream including organic solvent(s) through (Continued)

a granular bed including glass granules, wherein at least 90% of said glass granules have a maximum particle diameter smaller than 1.0 mm.

15 Claims, 3 Drawing Sheets

(51) Int. Cl.
    *C22B 3/04*          (2006.01)
    *C25C 1/00*          (2006.01)
    *C02F 1/40*           (2006.01)
    *C02F 103/16*       (2006.01)

(52) U.S. Cl.
    CPC ............ *C02F 1/40* (2013.01); *C02F 2103/16* (2013.01); *Y02P 10/234* (2015.11)

(56) References Cited

U.S. PATENT DOCUMENTS

| | | | | |
|---|---|---|---|---|
| 4,225,443 A | * | 9/1980 | Harris | B01D 39/06 |
| | | | | 210/263 |
| 4,481,113 A | * | 11/1984 | Canevari | B01D 17/0202 |
| | | | | 210/502.1 |
| 5,273,654 A | | 12/1993 | Severing | |
| 5,427,605 A | | 6/1995 | Gasparini Noziglia et al. | |

OTHER PUBLICATIONS

International Search Report issued by the Finnish Patent and Registration Office acting as the International Searching Authority in relation to International Application No. PCT/FI2016/050147 dated Jun. 10, 2016 (4 pages).

Written Opinion of the International Searching Authority issued by the Finnish Patent and Registration Office acting as the International Searching Authority in relation to International Application No. PCT/FI2016/050147 dated Jun. 10, 2016 (8 pages).

* cited by examiner

REMOVAL OF ORGANIC SOLVENTS FROM AQUEOUS PROCESS STREAMS

CROSS-REFERENCE TO RELATED APPLICATIONS

This application is a continuation of PCT International Application No. PCT/FI2016/050147filed Mar. 10, 2016, the disclosure of the application is expressly incorporated herein by reference in its entirety.

FIELD OF THE INVENTION

The present invention relates to removal of organic solvent(s) from aqueous process streams comprising the same, and more particularly to use of glass granules for separating organic solvent(s) from an aqueous process stream comprising organic solvent(s)

BACKGROUND OF THE INVENTION

Removal of organic solvents from aqueous process streams comprising the same is required in particular in recovery of metals by leaching wherein electrolyte solutions resulting from leaching of metal containing starting materials, such as ores and concentrates, are purifier prior to further processing stages such as electrowinning.

Typically removal of the organic solvents is accomplished by passing the aqueous process streams comprising organic solvents through a filter comprising anthracite particles. Upon contact with the anthracite particles in the filter the organics form small droplets in the liquid joining together forming lager droplets. At a certain droplet size the buoyance force will lift the droplet off the anthracite surface and the droplet moves up to the surface of the liquid where a layer of organics is collected.

One of the problems associated with the use of anthracite particles for separating the organics from the aqueous process stream is that for ensuring good organics removal the flux through the anthracite bed should be low enough to give enough residence time for the coalescence to take place. Typically the cross sectional flux i.e. the cross section filtration velocity in the filter is approx. 12 m/h. This means that fairly large amounts of anthracite must be used to get good filtration.

A further problem is that anthracite can be used for only about one year if regenerated properly with back-flush with water and/or air bubbles. Upon cleaning the anthracite is subjected to mechanical wear and the anthracite particles tend to get damaged. After this the anthracite must be treated as hazard waste that has to be destroyed as regeneration for reuse is not possible.

BRIEF DESCRIPTION OF THE INVENTION

An object of the present invention is thus to provide a method separating organic solvent(s) from an aqueous process stream comprising organic solvent(s) as to overcome the above problems. The objects of the invention are achieved by a method, a filter, use and a process which are characterized by what is stated in the independent claims. The preferred embodiments of the invention are disclosed in the dependent claims.

The invention is based on the surprising realization that passing an aqueous stream comprising organic solvent(s) through a granular bed comprising glass granules, wherein at least 90% of said glass granules have a maximum particle diameter smaller than 1.0 mm separate organic solvents effectively from the aqueous stream. The use of said glass granules supports coalescence reactions exceptionally well and allows much higher fluxes as compared to anthracite. It also allows running of the filtration process in a filter vessel or tank than with considerably smaller cross section are as compared to anthracite.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
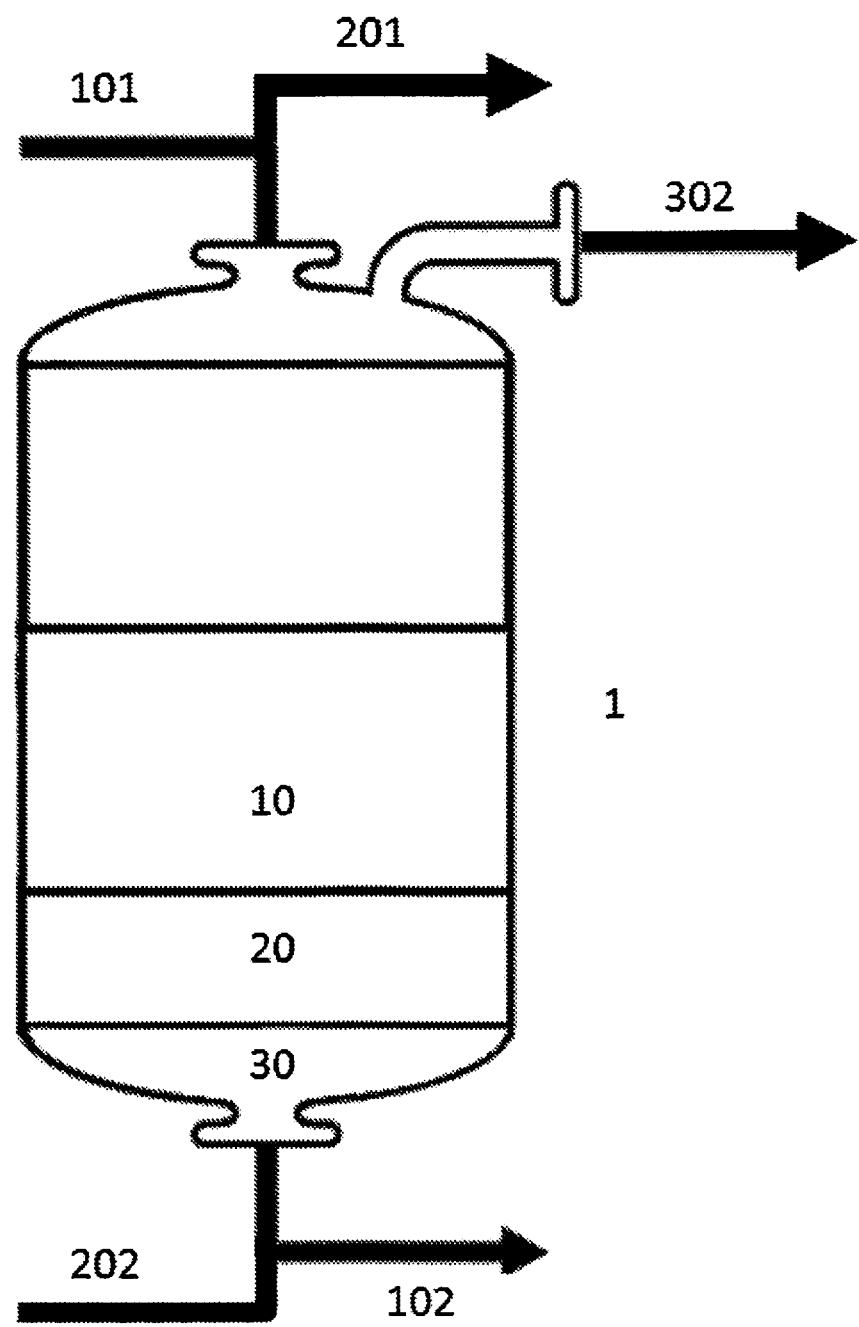
FIG. 1 shows a dual media filter.

Provided herein is a method for separating organic solvent(s) from an aqueous process stream comprising organic solvent(s) comprising passing said aqueous stream comprising organic solvent(s) through a granular bed comprising (a) glass granules, wherein at least 90% of said glass granules have a maximum particle diameter smaller than 1.0 mm. The present method is particularly suitable for electrolyte solutions resulting from a metal leaching process.

The term "glass granule" refers to glass particles having the defined maximum particle diameter. The glass granules may be of any shape. However, in an preferred example maximum particle radius to each dimension is within a 0.25 mm tolerance i.e. the outline of said glass granules is spherical but it may have depressions that exceed the said tolerance, i.e. the particle radius and/or diameter in the said depression is significantly smaller than the maximum particle radius on the spherical outline of the glass particle. In a preferred example said glass granules are spherical, more preferably they have smaller than 0.25 mm tolerance in roundness. In another example the glass granules are flat, preferably having a minimum particle diameter greater than 0.1 mm. In one example the glass granules have a flake shape. In an preferred aspect of this example maximum particle radius is within a 0.25 mm tolerance i.e. the outline of said glass granules is circular but it may have depressions that exceed the said tolerance, i.e. the particle radius and/or diameter in the said depression is significantly smaller than the maximum particle radius on the circular outline of the glass particle.

The term "maximum particle diameter" refers maximum dimension of the referred particle i.e. the glass granule. The particle diameter and the size distribution and deviation of the glass granules is determined by laser differentiation particle sizing, in particular according to ISO 13320:2009 standard, e.g. by using a Malvern Instruments Mastersizer 3000 laser particle size analyzer.

The term "comprise" as used herein and hereafter describes the referred constituents in a non-limiting manner, e.g. the present method comprising defined method steps consists, at least, of the said steps, but may additionally, when desired, comprise other method steps. However, the method comprising defined method steps may consist of only the said method steps. The term "comprise" is further used to reflect that the present granular bed comprising glass granules may contain, at least, of said glass granules, but may additionally, when desired, comprise other materials that are conventionally used in granular beds. However, the granular bed comprising defined glass granules may contain only the glass granules.

The presently defined granular bed comprises (a) glass granules that act as coalescence inducers in a granular bed through which the separated aqueous stream is passed. The flux of the aqueous stream though the granular bed may vary depending on the size of the glass granules, however, typically the cross section filtration velocity is from 10 to 80 m/h. The use of present glass granules allows higher flux than the use of conventional anthracite bed. Preferably the cross section filtration velocity is from 12 to 50 m/h, more preferably from 15 to 60 m/h, even more preferably from 20 to 40 m/h. The term "cross section filtration velocity" refers to flux or flow rate as the aqueous stream passes through the horizontal cross section of the filter. Thus the cross section filtration velocity is dependent on the diameter of the filter vessel i.e. the diameter of the granular bed and can be expressed equally by unit $m^3/m^2h$, i.e. volume ($m^3$) moving through a cross section ($m^2$) for a time unit (h).

At least 90%, more preferably at least 95%, of said glass granules (a) have a maximum particle diameter smaller than 1.0 mm. This provides adequate coalescence reactions and allows reasonable flux of the aqueous stream through the granular bed. The percentage refers to better separation of the organic solvent(s) and/or higher fluxes can be attained when at least 90% of said glass granules have a maximum particle diameter smaller than 0.85 mm, preferably smaller than 0.8 mm, more preferably smaller than 0.7. Further preferably at least 80% of said glass granules have a maximum particle diameter smaller than 0.7 mm. Typically at least 50% of said glass granules have a maximum particle diameter smaller than 0.6 mm.

If the granular bed comprises too much too small glass granules it may cause disruption of the flux through the granular bed. Thus preferably at least 50% of said glass granules have a maximum particle diameter greater than 0.1 mm, preferably greater than 0.2 mm, more preferably greater than 0.3 mm, even more preferably greater than 0.4. More preferably at least 90% of said glass granules have a maximum particle diameter greater than 0.2 mm, preferably greater than 0.3 mm, more preferably greater than 0.4.

In preferred example at least 50%, more preferably at least 80%, of said glass granules have a maximum particle diameter from 0.3 to 0.7 mm.

The present glass granules may be provided from any glass composition. Typically main constituents of said glass granules are $SiO_2$, $Na_2O$ and $CaO$.

For accomplishing the present method an aqueous process stream comprising organic solvent(s) is passed through a granular bed comprising (a) herein defined glass granules. Typically such granular bed in arranged within a filter vessel.

Accordingly provided herein is a filter for separating organic solvent(s) from an aqueous process stream comprising said organic solvent(s), comprising
  (a) a vessel;
  (b) a granular bed in said vessel comprising
    (i) glass granules, wherein at least 90% of said glass granules have a maximum particle diameter smaller than 1.0 mm; and
  (c) means for passing fluid into said vessel, down through said granular bed and then out of said vessel.

Typically the granular bed comprises at least a first layer of herein defined glass granules. Preferably the thickness of such first layer is from 5 to 80 cm, more preferably from 20 to 60 cm.

In addition to the herein defined glass granules (a) the granular bed may further comprise (b) garnet. Typically the granular bed comprises at least a second layer of said garnet. Said garnet layer is typically arranged below the layer of herein defined glass granules. The garnet layer removes fine solid particulates from the aqueous stream passed though the granular bed. The optimal thickness of the garner layer is dependent on the amount and size of solid particulates in the aqueous process stream passed through the granular bed. The more solids in the aqueous process stream the thicker layer of garnet is desirable. Preferably the thickness of such second layer is from 30 to 50 cm.

The granular bed may still further comprise (c) sand. Typically the granular bed comprises at least a third layer of said sand. Said sand layer is typically arranged below the layer of above discussed garnet (b). The thickness of the sand layer is dependent on the diameter of the filtration vessel as typically the bottom of the vessel is convex and sand is desirably arranged to fill the bottom. Typically the thickness of such third layer is from 50 to 100 cm. The sand layer acts as a support for the glass granule layer and optional garnet layer and covers the means for collecting the fluid that has passed through the granular bed.

The present filter may further comprise a coalescing device in said vessel above said granular bed.

The presently defined filter is preferably a dual media filter. FIG. 1 shows a dual media filter comprising a vessel 1 containing a granular bed consisting of a first layer of glass granules 10, a second layer of garnet 20, and a third layer of sand 30. An aqueous process stream comprising said organic solvent(s) is fed into the filter 1 through an inlet 101, passed through the granular bed consisting of the layers 10, 20 and 30 and removed from the vessel 1 though a first outlet 102. The organics comprised in the aqueous process stream coalesce on the surface of the glass granules in the first layer of glass granules and move up to the surface of the liquid where a layer of organics is collected and is removed from the vessel 1 through a second outlet 302. The granular bed consisting of the layers 10, 20, and 30 may be regenerated with back-flush with water or lean aqueous stream e.g. lean electrolyte which is provided into the vessel 1 through a second inlet 202 arranged at the bottom of the vessel 1 and removed from a third outlet 201 arranged on the top of the vessel 1.

The desired effect of the present method is accomplished by the use of the herein defined glass granules. Accordingly provided herein is use of the herein defined glass particles for separating organic solvent(s) from an aqueous process stream comprising organic solvent(s), in particular for separating organic solvent(s) from an electrolyte solution resulting from a metal leaching process.

As the present method is particularly suitable for separating organic solvent(s) from an electrolyte solution resulting from a metal leaching process it may be used within a (hydro)metallurgical metal recovery process for purifying such an electrolyte solution before it is subjected to a metal recovery stage.

Accordingly further provided herein is a method for recovering metal(s) from an starting material comprising said metal(s), comprising
  (i) leaching the starting material in a leaching solution to obtain a pregnant leaching solution;
  (ii) extracting the metal(s) from the pregnant leaching solution by a extraction solution comprising organic solvent (s) to obtain an organic solution comprising the metal(s);

(iii) stripping metals(s) from the organic solution comprising the metal(s) with an aqueous solution to obtain an electrolyte solution comprising said metal(s);

(iv) removing any remaining organic solvent(s) from the electrolyte solution by a method defined herein to obtain a purified electrolyte solution; and (v) recovering metal(s) from the purified electrolyte solution.

EXAMPLES

Example 1

Figure 2:
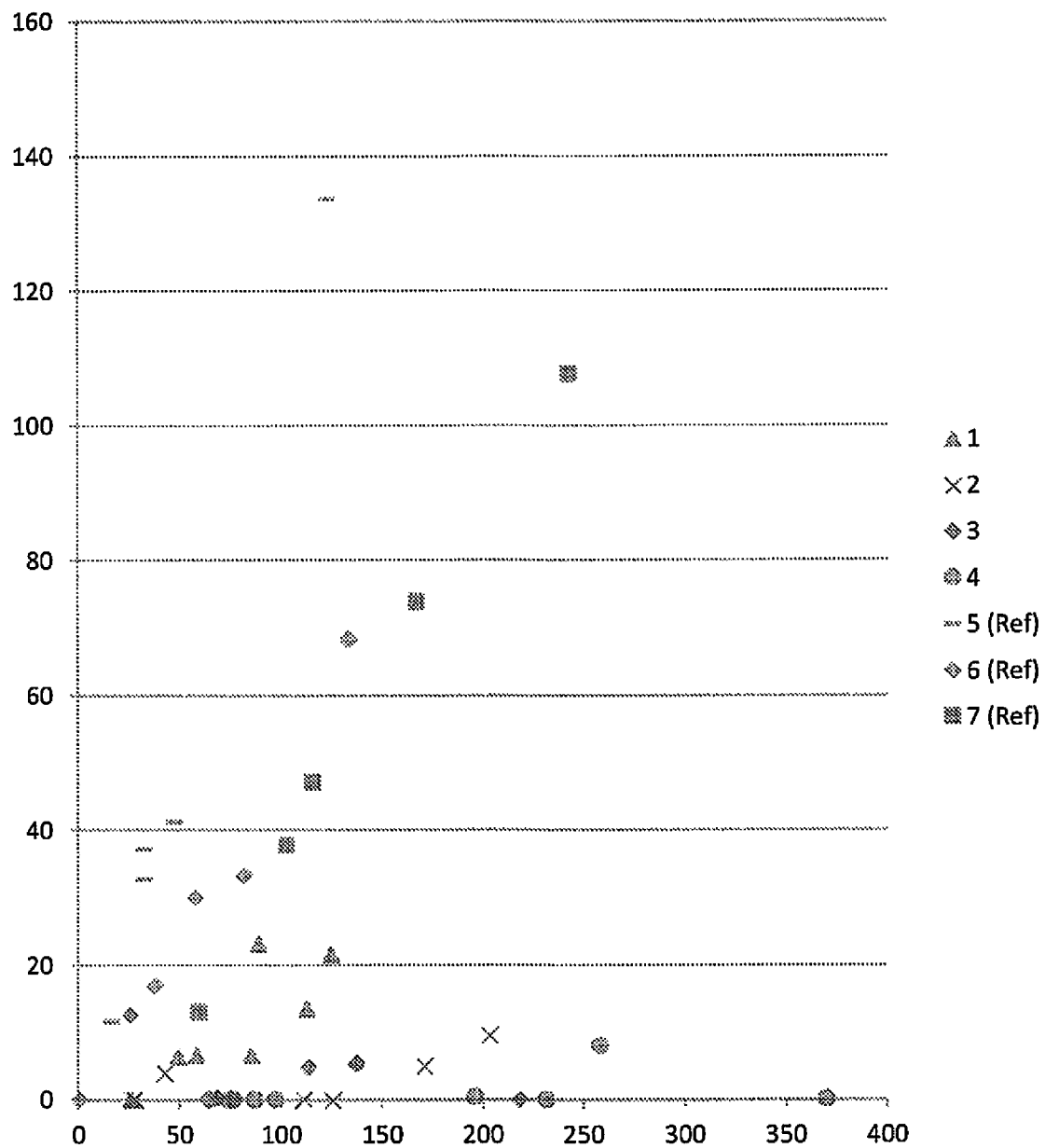
FIG. 2 shows comparative results from separation tests.

Indicated filter medium was packed in a column. The thickness of the filter medium was the same in each case. Flux rate of an aqueous electrolyte stream containing organic solvents, $CuSO_4$ and $H_2SO_4$ through the filter cross section area was 19.6 m/h. The inlet concentration of the organic solvents was varied as indicated. FIG. 2 shows results from testing the separation efficiency of the organics through the column.

The tested glass granule filter media were:
(1) Silibeads 0.5-0.75 mm
(2) Silibeads 0.4-0.6 mm
(3) Silibeads 0.25-1.0 mm
(4) Cerablast 0.4 mm
The tested reference particles were:
(5) Mullite 60 granules 0.5 mm
(6) Stainless steel balls 0.5 mm
(7) Anthracite 0.9 mm Example 2

Figure 3:
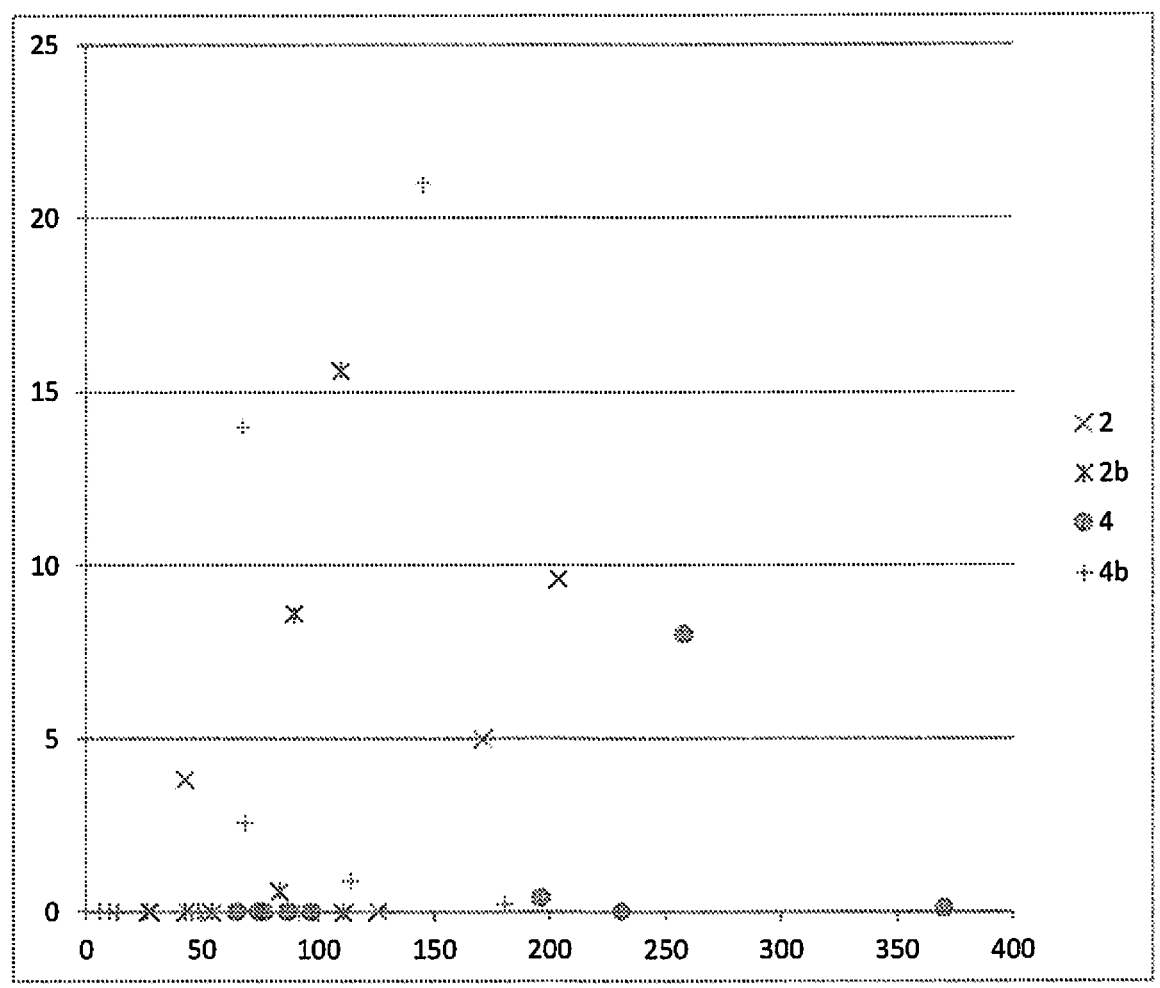
FIG. 3 shows results from separation test with different flux rates.

The above described test was repeated at two different flux rates to demonstrate that increased flux does not compromise the separation efficiency of the glass particles. FIG. 3 shows results from this test.

The tested glass granule filter media and flux rates were:
(2) Silibeads 0.4-0.6 mm 19.6 m/h
(2b) Silibeads 0.4-0.6 mm 37.0 m/h
(4) Cerablast 0.4 mm 19.6 m/h
(4b) Cerablast 0.4 mm 37.0 m/h It will be obvious to a person skilled in the art that, as the technology advances, the inventive concept can be implemented in various ways. The invention and its embodiments are not limited to the examples described above but may vary within the scope of the claims.

The invention claimed is:

1. A method for separating organic solvent(s) from an aqueous process stream comprising organic solvent(s), the method comprising:
    passing said aqueous process stream comprising organic solvent(s) through a granular bed comprising glass granules, wherein at least 90% of said glass granules have a maximum particle diameter smaller than 1.0 mm, and wherein
    said aqueous process stream comprises organic solvent(s) is an electrolyte solution resulting from a metal leaching process.

2. The method as claimed in claim 1, wherein the cross section filtration velocity is from 10 to 80 m/h.

3. The method as claimed in claim 1, wherein at least 90% of said glass granules have a maximum particle diameter smaller than 0.85 mm.

4. The method as claimed in claim 1, wherein at least 50% of said glass granules have a maximum particle diameter greater than 0.1 mm.

5. The method as claimed in claim 1, wherein at least 90% of said glass granules have a maximum particle diameter greater than 0.2 mm.

6. The method as claimed in claim 1, wherein at least 80% of said glass granules have a maximum particle diameter smaller than 0.7 mm.

7. The method as claimed in claim 1, wherein at least 50% of said glass granules have a maximum particle diameter smaller than 0.6 mm.

8. The method as claimed in claim 1, wherein at least 50% of said glass granules have a maximum particle diameter from 0.3 to 0.7 mm.

9. The method as claimed in claim 1, wherein said glass granules are spherical.

10. A method of using glass particles for separating organic solvent(s) from an aqueous process stream comprising organic solvent(s), comprising:
    utilizing glass granules wherein at least 90% of said glass granules have a maximum particle diameter smaller than 1.0 mm, and wherein
    the aqueous process stream comprising organic solvent(s) is an electrolyte solution resulting from a metal leaching process.

11. The method as claimed in claim 10, wherein at least 90% of said glass granules have a maximum particle diameter smaller than 0.85 mm.

12. The method as claimed in claim 10, wherein at least 50% of said glass granules have a maximum particle diameter greater than 0.2 mm.

13. The method as claimed in claim 10, wherein at least 50% of said glass granules have a maximum particle diameter from 0.3 to 0.7 mm.

14. The method as claimed in claim 10, wherein said glass granules are spherical.

15. A method for recovering metal(s) from a starting material comprising said metal(s), comprising:
    (i) leaching the starting material in a leaching solution to obtain a pregnant leaching solution;
    (ii) extracting the metal(s) from the pregnant leaching solution by a extraction solution comprising organic solvent(s) to obtain an organic solution comprising the metal(s);
    (iii) stripping metals(s) from the organic solution comprising the metal(s) with an aqueous solution to obtain an electrolyte solution comprising said metals(s);
    (iv) removing any remaining organic solvent(s) from the electrolyte solution by the method claimed in claim 1, to obtain a purified electrolyte solution; and
    (v) recovering metal(s) from the purified electrolyte solution.

* * * * *